US007483409B2

(12) United States Patent
Zheng

(10) Patent No.: US 7,483,409 B2
(45) Date of Patent: Jan. 27, 2009

(54) WIRELESS ROUTER ASSISTED SECURITY HANDOFF (WRASH) IN A MULTI-HOP WIRELESS NETWORK

(75) Inventor: Heyun Zheng, DeBary, FL (US)

(73) Assignee: Motorola, Inc., Schaumburg, IL (US)

( * ) Notice: Subject to any disclaimer, the term of this patent is extended or adjusted under 35 U.S.C. 154(b) by 588 days.

(21) Appl. No.: 11/323,727

(22) Filed: Dec. 30, 2005

(65) Prior Publication Data

US 2007/0153739 A1 Jul. 5, 2007

(51) Int. Cl.
*H04Q 7/00* (2006.01)
(52) U.S. Cl. ........................................ 370/331; 370/338
(58) Field of Classification Search ................ 370/331, 370/338, 401; 455/411, 436
See application file for complete search history.

(56) References Cited

U.S. PATENT DOCUMENTS

| 6,922,728 | B2 | 7/2005 | Cho | |
|---|---|---|---|---|
| 2004/0103282 | A1 | 5/2004 | Meier et al. | |
| 2004/0240412 | A1 | 12/2004 | Winget | |
| 2005/0141457 | A1* | 6/2005 | Lee et al. | 370/331 |
| 2005/0143073 | A1 | 6/2005 | Lee et al. | |
| 2005/0220054 | A1* | 10/2005 | Meier et al. | 370/331 |
| 2006/0056448 | A1* | 3/2006 | Zaki et al. | 370/466 |
| 2006/0067272 | A1* | 3/2006 | Wang et al. | 370/331 |
| 2006/0121883 | A1* | 6/2006 | Faccin | 455/411 |
| 2007/0147376 | A1* | 6/2007 | Perlman et al. | 370/392 |
| 2007/0206537 | A1* | 9/2007 | Cam-Winget et al. | 370/331 |
| 2007/0280169 | A1* | 12/2007 | Cam Winget | 370/331 |

OTHER PUBLICATIONS

Context Caching using Neighbor Graphs for Fast Handoffs in a Wireless Network, Arunesh Mishra, et al. IEEE Infocom, 2004, 11 pages.

\* cited by examiner

*Primary Examiner*—Min Jung
(74) *Attorney, Agent, or Firm*—Randi L. Karpinia

(57) ABSTRACT

A wireless router assisted security handoff method (300) includes an efficient layer 2 security handoff for an infrastructure-based mobile multi-hop wireless network. The handoff is assisted with a wireless router (311) which is the first hop from the mobile station (301) to the new access point (307). The security context from the old access point (303) is first delivered to the mobile station (301) in a secure manner. The first handoff message (309) from mobile station (301) to the new access point (307) has three roles namely, re-association request, security context delivery and new session key generation handshaking. The first hop wireless router (311) vouches the freshness of the message contents and tunnels the message securely to the new access point (307). The second message (315) from the new access point (307) to the mobile station (301) completes the handoff process.

16 Claims, 3 Drawing Sheets

WIRELESS ROUTER ASSISTED SECURITY HANDOFF (WRASH) IN A MULTI-HOP WIRELESS NETWORK

FIELD OF THE INVENTION

The present invention relates generally to wireless multi-hop networks and more particularly to a secure handoff between a mobile station and an access node in a multi-hop wireless network.

BACKGROUND

For mobile wireless network real-time applications, such as voice over Internet protocol (IP) and live stream video, fast handoff is desirable to facilitate end user acceptance of the emerging advanced multi-hop wireless networks, such as wireless mesh networks. A seamless handoff for a mobile station moving from one access point (AP) to another AP greatly improves the application performance and usability.

The mobile station handoff between access points can involve one or both link layer and network layer handoffs. Due to the fact that a subnet usually covers multiple access points, most handoffs only occur at the link layer. Therefore, a fast and secure link layer handoff enhances overall network performance. When a mobile station first joins a network, the initial authentication and key management for a security association between the mobile station and the AP may take a relatively long time, sometimes on the order of several seconds. As the mobile station moves between APs, re-starting a full authentication and key management protocol will inevitably impact the handoff performance. In current wireless local area network (LAN) topologies, two classes of approaches for fast handoff have been proposed: these include "pre-authentication" handoff and "security context transfer" handoff.

With regard to the pre-authentication handoff approach, mobile devices can authenticate to a new access point before disconnecting with an old access point, either through the old AP or directly to the new AP. This handoff is relatively fast since the new security session key is ready to use when the mobile decides to move to the new access point. One challenge to the pre-authentication approach is finding a balance between locating the correct new AP and allocating adequate time for the pre-authentication. The difficulty increases with high speed environments where the handoff cannot efficiently incur the time delay necessary for a full authentication and key management process.

A variety of schemes have been proposed with regard to the security context transfer handoff approach. One such scheme is the Inter Access-Point Protocol (IAPP) exchange of a mobile device's security context between a current AP and a new AP. In this scheme, the security context can be proactively distributed using neighbor AP graphs or reactively pulled by the new AP from the old AP. In the newly proposed IEEE 802.11(r) standard, the security context is distributed among a hierarchy of key holders. Thus, in these types of handoff schemes, the delay of a four-way handshake for deriving new pairwise transient key (PTK) is not reduced and the overhead in terms of memory and computation requirements may be large. In IEEE 802.11(r), additional hardware for the top key holder may be needed.

Thus, it would be advantageous to provide a method for reducing the number of messages required for handoff in a secure fashion.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
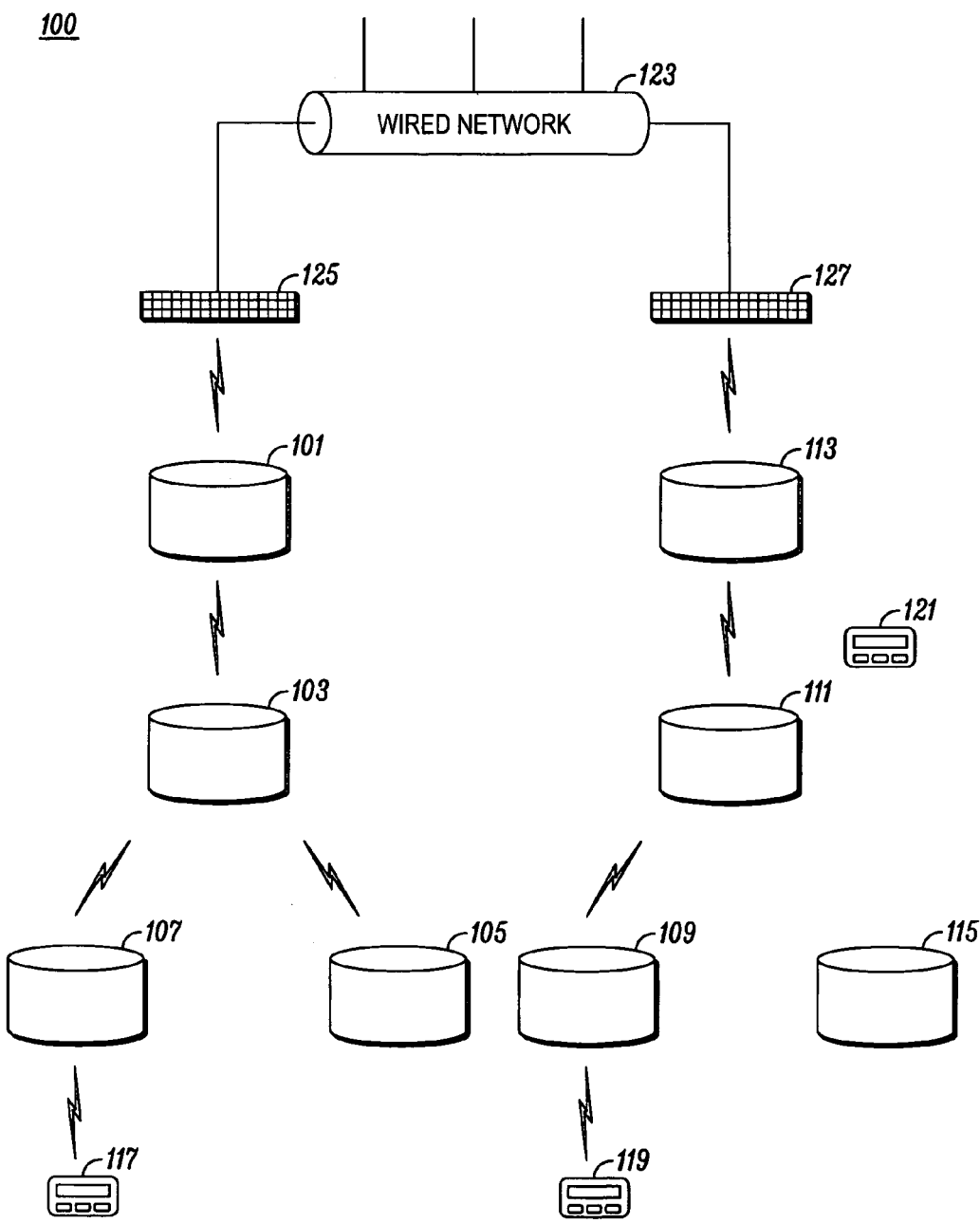
FIG. 1 is a block diagram illustrating an infrastructure-based multi-hop wireless network in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a wireless router assisted security handoff in a multi-hop wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a wireless router assisted security handoff in a multi-hop wireless network described herein. The non-processor circuits may include, but are not limited to, a radio receiver, a radio transmitter, signal drivers, clock circuits, power source circuits, and user input devices. As such, these functions may be interpreted as steps of a method to perform a wireless router assisted security handoff in a multi-hop wireless network Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In recent years, mobile wireless networks have received tremendous attention in the fields of public safety and intelligent transportation in view of their industrial applications. In most of those application deployments, access to one or more wired networks is needed. Even in peer-to-peer applications where a mobile wireless station communicates with another mobile station, the wired infrastructure may still be needed for improving performance by reducing wireless hops of two, relatively far-apart, communicating, wireless mobile stations. In the design of such multi-hop wireless networks, mobile stations can maintain continuous connectivity with an access point through one or more wireless routers. Therefore, the performance of the communication between the wired networks and the mobile station, or a mobile station and a distant mobile station can be significantly improved.

FIG. 1 is a block diagram illustrating an infrastructure-based multi-hop wireless network 100. The wireless routers 101, 103, 105, 107, 109, 111 and 115 are used to route the packets for mobile stations 117, 119, 121. As can be appreciated by one skilled in the art, the wireless routers can transmit and receive data packet communications in a multiplexed format, such as time-division multiple access (TDMA) format, code-division multiple access (CDMA) format, or frequency-division multiple access (FDMA) format, Only the paths from an exemplary mobile station to a wired network are shown. The wired network can include, for example, a core local access network (LAN), and a plurality of servers and gateway routers to provide network nodes with access to other networks, such as other ad-hoc networks, the public switched telephone network (PSTN) and the Internet.

Those skilled in the art will further recognize that meshed connection or those network connections established between wireless routers or other like devices. Meshed connections among wireless routers 101, 103, 105, 107, 109, 111, 113 and 115 can be established whenever two neighboring devices can communicate with one another. When an end-to-end security model in the link layer is used in the multi-hop wireless network 100, a security association is established between two communication nodes within a wireless domain in the link layer. For example, mobile stations 119, 121 can establish a security association when the two devices communicate with one another through wireless routers 109, 111, and 113. All traffic going into or from the wired network 123 will pass through access points 125, 127. Therefore, mobile stations 119, 121 will continuously maintain both a link layer association and a security association with one of the access points 125, 127. There may be any number of wireless routers between a given mobile station and an access point. It will be appreciated by those of ordinary skill in the art that due to the inherent delay at each communications hop, each of the pre-authentication, four-way handshaking and key material distribution in the security context transfer schemes may take a longer time during handoff.

The present invention provides a fast handoff scheme that is related to the security context caching handoff approach which can be described as a wireless router assisted security handoff (WRASH). The wireless router precipitates the handoff by vouching the "freshness" of an "Anonce" in order to prevent the possible replay attack. Those skilled in the art will recognize that an Anonce is a random number sent from an authenticator to the supplicant during the four-way handshaking. The security context is transferred through the mobile station in the handoff. The re-association and the four-way handshake messages are combined into only two messages.

The following is a detailed description of the scheme employed by the present invention. The present invention utilizes a method that requires all the access points to be pre-configured with a security context encryption key (SCEK). The SCEK may also be dynamically negotiated among all the access nodes or points. This requirement is generally necessary for all security context caching fast handoff schemes. In an inter-access point protocol (IAPP), a Remote Authentication Dial In User Service (RADIUS) server is recommended to provide the shared keys among access points. The SCEK can, for example, be at least 128 bits long and robust enough to resist any cryptographic attack on cipher text.

With regard to the security context to the mobile station, when a mobile station initially joins the network, it performs a full authentication and key management protocol with a selected access point. This is similar to the security framework as described in the Institute for Electrical and Electronics Engineers (IEEE 802.11(i)) standard for a wireless local area network (WLAN). During this initial transaction, a pair-wise master key (PMK) and pairwise transient key (PTK) can be generated at both the mobile station and the access point. The difference from the WLAN perspective lies in that the authentication and key management messages are transported over multiple wireless routers via a mesh routing forwarding feature in the multi-hop wireless network.

Thus, in addition to the PMK, the mobile station and access point will also generate a handoff PMK (PMK_H) that is equivalent to the Pseudo-Random Function (PRF)-256 bits (PMK, "Handoff PMK Derivation," Supplicant Address (SPA)). The pseudo-random function is defined in the IEEE 802.11(i) standard where the designation "PRF-256" specifies the output bit length of pseudo-random function. The "SPA" is the media access control (MAC) address of mobile station. Those skilled in the art will recognize that the MAC layer is one of two sub-layers that make up the data link layer of the open systems interconnection (OSI) model. The MAC layer is responsible for moving data packets to and from one Network Interface Card (NIC) to another across a shared channel. The MAC sublayer uses MAC protocols to ensure that signals sent from different stations across the same channel do not collide.

The security context for the handoff includes the PMK handoff (PMK_H), PMK_H lifetime with a start/end time and SPA. The security context will be encrypted in the current access point with the SCEK where the encrypted data is named as the protected security context (PSC). The access point then delivers this PSC to the mobile station during an initial security session setup time. This can be done in the same fashion as the group temporal key (GTK) delivery from the access point to the mobile station as defined in an IEEE 802.11(i) standard framework. When the mobile station receives the PSC, the PSC can be reused until its expiration.

In the present invention, the wireless router plays an important role in generating a sequence number (SN) and vouching its validity to the access point. In the multi-hop wireless network, when the wireless router powers up, it establishes a security association with an access point, and a secure channel is set up between the wireless router and access point. Each wireless router in the network will maintain a sequence number. The wireless router broadcasts its sequence number and its associated access point MAC address (AA) in its "hello" message. The sequence number will be increased only when the wireless router receives a valid re-association request from a mobile station.

Figure 2:
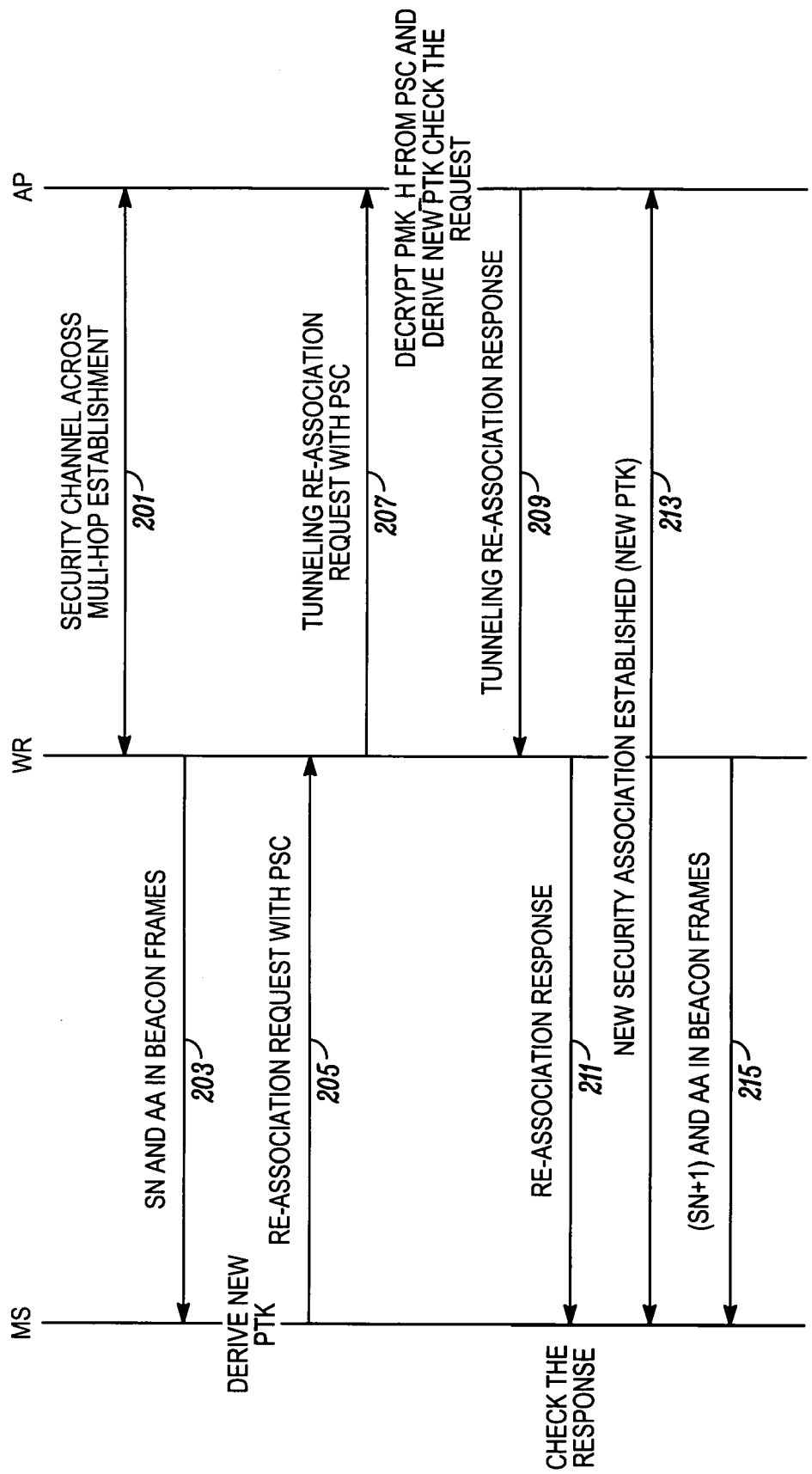
FIG. 2 is a flow diagram illustrating communications between the mobile station (MS), wireless router (WR) and access point (AP).

FIG. 2 illustrates a flow diagram 200 of communications between the mobile station (MS), wireless router (WR) and access point (AP). When a mobile station selects a first hop wireless router to handoff to a new access point, it retrieves the SN and the AA from the first hop wireless router's hello message and generates a new PTK 201. The new PTK is equal to PRF-X (PMK_H , "Pairwise Key Expansion," AA ||SPA||SN||MS_Nonce) where X is the length of PRF output, and the MS_Nonce is a random number generated by the mobile station. The SN used in the PTK derivation will be-retrieved from the latest beacon frame ("hello message") 203 received by the mobile station where the SN is used as the Anonce as in the four-way handshake of the IEEE 802.11(i) standard. Since there is a trust relationship between the wireless router and the access point, the access point will trust the wireless router to maintain a valid SN to be used as the Anonce. The wireless router will check the age and or "freshness" of the re-association request based on the SN to prevent replay attack. The handoff request from the mobile station is combined with a re-association request 205. The information in the request can include: a message identification (MID), PSC, SN, MS_Nonce, AA, SPA, wireless router address (WRA) and a message integrality code (MIC). The WRA is the MAC address of the chosen wireless router and is used to tie the SN to this wireless router. The MIC is a "message integrity check" code that is generated with the mobile station's newly derived PTK over the re-association message contents. After generating the re-association message as stated above, the mobile station will then transmit the message to the chosen wireless router.

When a wireless router receives a re-association request 205, it will check the SN, SPA and AA in the message. The wireless router will discard the re-association requests which have the previous SN with the same SPA. If the check is passed, it will securely tunnel the message to the access point and will also increase its current SN value by 1. Those skilled in the art will recognize the term "tunnel" or "tunneling" refers to data passing or making its way through wireless routers on the way to the mobile station or other final destination.

When the new access point receives the re-association request from the wireless router 207, it decrypts the protect security context (PSC) with SCEK. It then generates a PTK from PMK_H, SN, MS_Nonce, AA, SPA as done by the mobile station. The MIC in the received message is then checked with the new PTK. After obtaining PTK, the new AP will generate the re-association response which includes GTK, MID, WRA, AA, SPA and MIC. The MIC in the reply message is generated with the new PTK over the reply message contents. After the reply is generated, it will securely tunnel the message 209 to the sending WR. When the reply message is received by the wireless router, it will send the tunneled re-association reply to the mobile station 211. After mobile station receives the reply, it then checks the MIC in the reply message with the new PTK. If this check comparison is passed, the security handoff process shall be completed 213 in that both the mobile station and the new access point share a common PTK that can be used to secure the data flow between these two devices. The wireless router subsequently sends a message 215 in its beacon frame to the mobile station where there serial number is increased by one (SN+1) all with the AA are include in the message to indicate the security association has been established.

Figure 3:
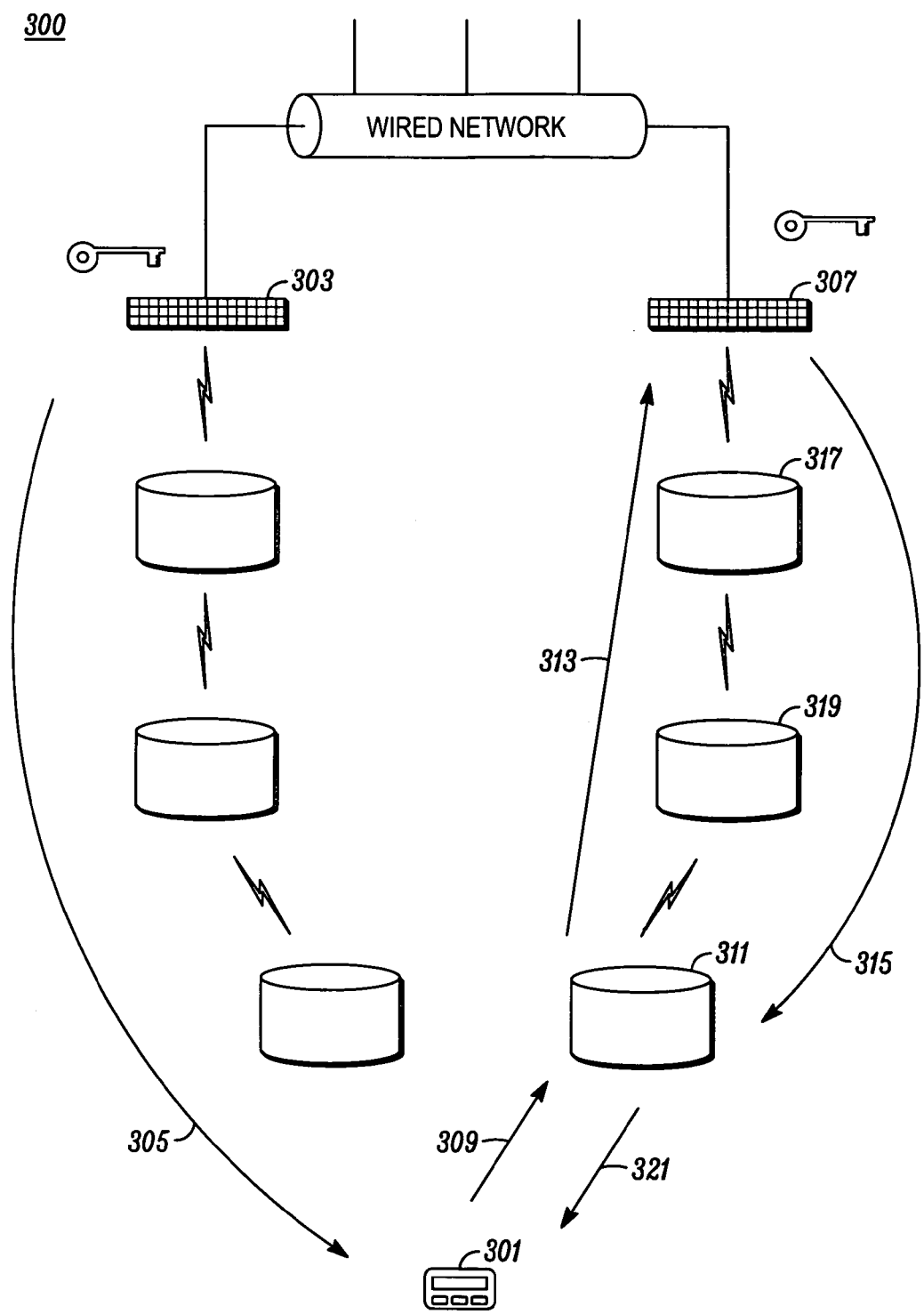
FIG. 3 is a block diagram illustrating the message flow between two participating devices in the multi-hop wireless network of FIG. 1.

An example of the method of the invention is shown in FIG. 3, where two handshaking messages are passed between the participating devices 300 as previously described in FIG. 1. In this example, the mobile station 301 is first associated with an old access point 303 where it receives protected security context (PSC) data 305. When the mobile station 301 decides to move to the new access point 307, it will send a re-association message 309 to the choosen wireless router 311 shown. The wireless router 311 will tunnel the re-association message 313 to the new access point 305 after it validates the age of the re-association message. The new access point 305 will then generate a PTK and which validates the re-association message with new PTK. Thereafter, the new access point 305 will send a re-association reply message 315 to the wireless router 311 through wireless routers 317 and 319. The wireless router 311 in-turn transmits the message 321 it to the mobile station 301.

Thus, the security handoff scheme of the present invention utilizes a trust relationship between a wireless router and an access point which is established when the wireless router is authenticated with the access point. The wireless router will generate the Anonce in the form of a sequence number to be used in the handoff process. One of the advantages of the present method is that only two messages are needed for the entire security handoff process. The scheme represents a significant reduction in the handoff delay time period as compared with existing handoff schemes. Moreover, the re-association request is authenticated with the new pair-wise transient key (PTK). The new scheme increases the security of the re-association mechanism in the communications network to reduce the risk of the denial of server attack on the associated stations and access points. Finally, the method of the invention is much simpler than other current security context transfer based methods since no additional secure context distribution protocols are needed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for a wireless router assisted security handoff in a multi-hop communications network comprising:
　at a mobile station:
　　selecting a wireless router which is a first hop to an access point for assisting in a secure handoff;
　　retrieving a sequence number (SN) of the wireless router and an access point media access control (MAC)

address (AA) of the access point from a hello message received from the wireless router;

generating a pairwise transient key (PTK) using the SN and the AA;

sending a first handoff message including a re-association request from the mobile station to the wireless router;

at the wireless router:

tunneling the first handoff message securely to the access point;

at the access point:

receiving the first handoff message from the wireless router;

generating the pairwise transient key (PTK) using the SN and the AA;

validating a message integrity of the first handoff message using the PTK;

generating a second handoff message including a re-association response using the PTK;

sending the second handoff message to the wireless router; and at the wireless router:

tunneling the second handoff message securely to the mobile station; and at the mobile station:

validating a message integrity of the second handoff message using the PTK; and establishing communications between the mobile station and the access point.

2. A method for a wireless router assisted security handoff as in claim 1, wherein the first handoff message comprises one or more of a message identification (MID), a protected security context (PSC) of the mobile station, the sequence number (SN) of the wireless router, a MS_Nonce, the AA of the access point, a media access control (MAC) address of the mobile station (SPA), a wireless router address (WRA) and a message integrity code (MIC).

3. A method for a wireless router assisted security handoff as claimed in claim 1, further comprising:

configuring a security context encryption key (SCEK) at all the network access points including the access point; and decrypting the first handoff message received at the access point using the SCEK.

4. A method for a wireless router assisted security handoff as in claim 3, wherein the access node is preconfigured with the SCEK.

5. A method for a wireless router assisted security handoff as in claim 1, wherein a plurality of wireless routers are connected to form the multi-hop communication network.

6. A method for a wireless router assisted security handoff as in claim 1, further comprising prior to the selecting step:

providing a security association between the wireless router and the access node when the wireless router joins the network.

7. A method for a wireless router assisted security handoff as in claim 1, wherein the wireless router maintains information regarding the access node.

8. A method for a wireless router assisted security handoff as in claim 7, wherein the information is comprised of a sequence number (SN), a broadcast SN, and a media access control (MAC) address.

9. A method for a wireless router assisted security handoff as in claim 7, wherein the information is a hello message of the access node.

10. A method for a wireless router assisted security handoff as in claim 1, wherein the validating by the mobile station of the second handoff message further comprises using the a sequence number (SN) and the media access control (MAC) address of the mobile station.

11. A method for a wireless router assisted security handoff as claimed in claim 1, further comprising prior to the selecting step:

generating a handoff pairwise master key (PMK) at both a first access point and the mobile station during an initial mobile station authentication;

generating protected security context (PSC) data at the first access point by encrypting the handoff PMK and a media access control (MAC) address of the mobile station;

transmitting the PSC from the first access point to the mobile station during the initial mobile station authentication; and transmitting the handoff PMK in the PSC data from the first access point to the access point via the mobile station after establishing communication between the mobile station and the access point.

12. A method for a wireless router assisted security handoff as in claim 11, wherein the master key PMK is created with an initial PMK and the mobile station media access control (MAC) address.

13. A method for a wireless router assisted security handoff as in claim 11, wherein the initial mobile station authentication includes the key management process.

14. A method for a wireless router assisted security handoff as in claim 11, wherein the PTK is a secured re-association request message.

15. A method for a wireless router assisted security handoff as in claim 14, wherein the secured re-association request message includes the PSC data and supplemental information for generating the PTK.

16. A method for a wireless router assisted security handoff as in claim 11, wherein the age of the re-association request message is validated based on its sequence number.

* * * * *